UNITED STATES PATENT OFFICE.

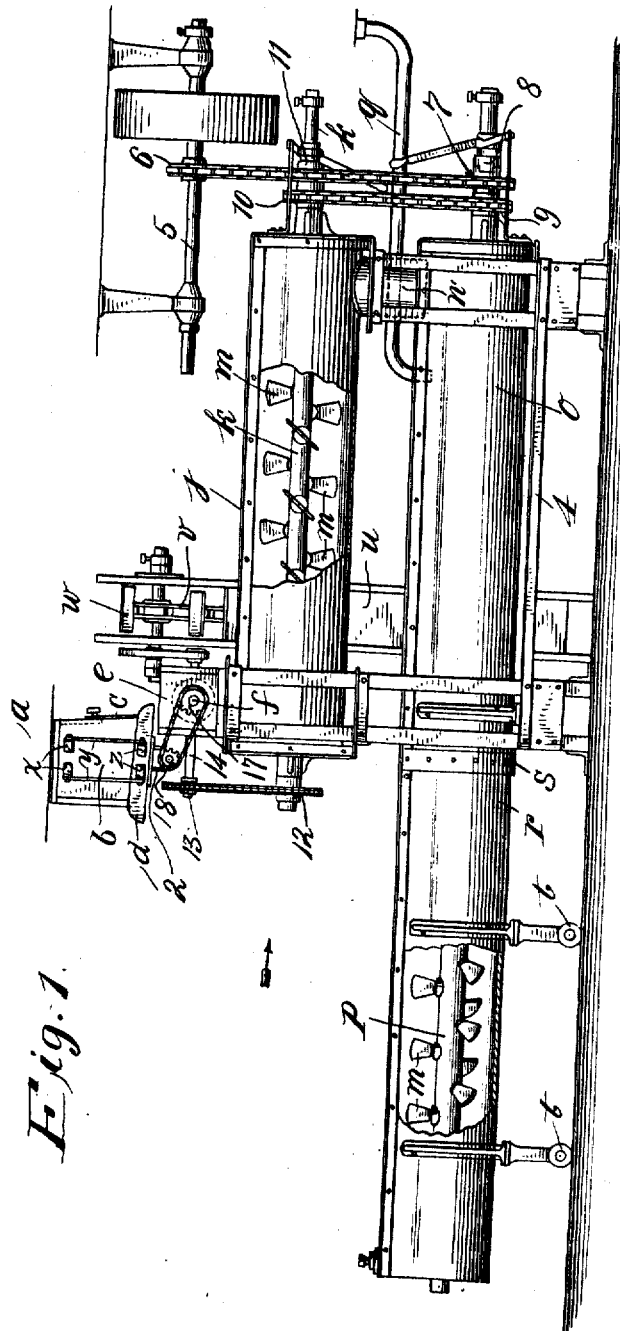

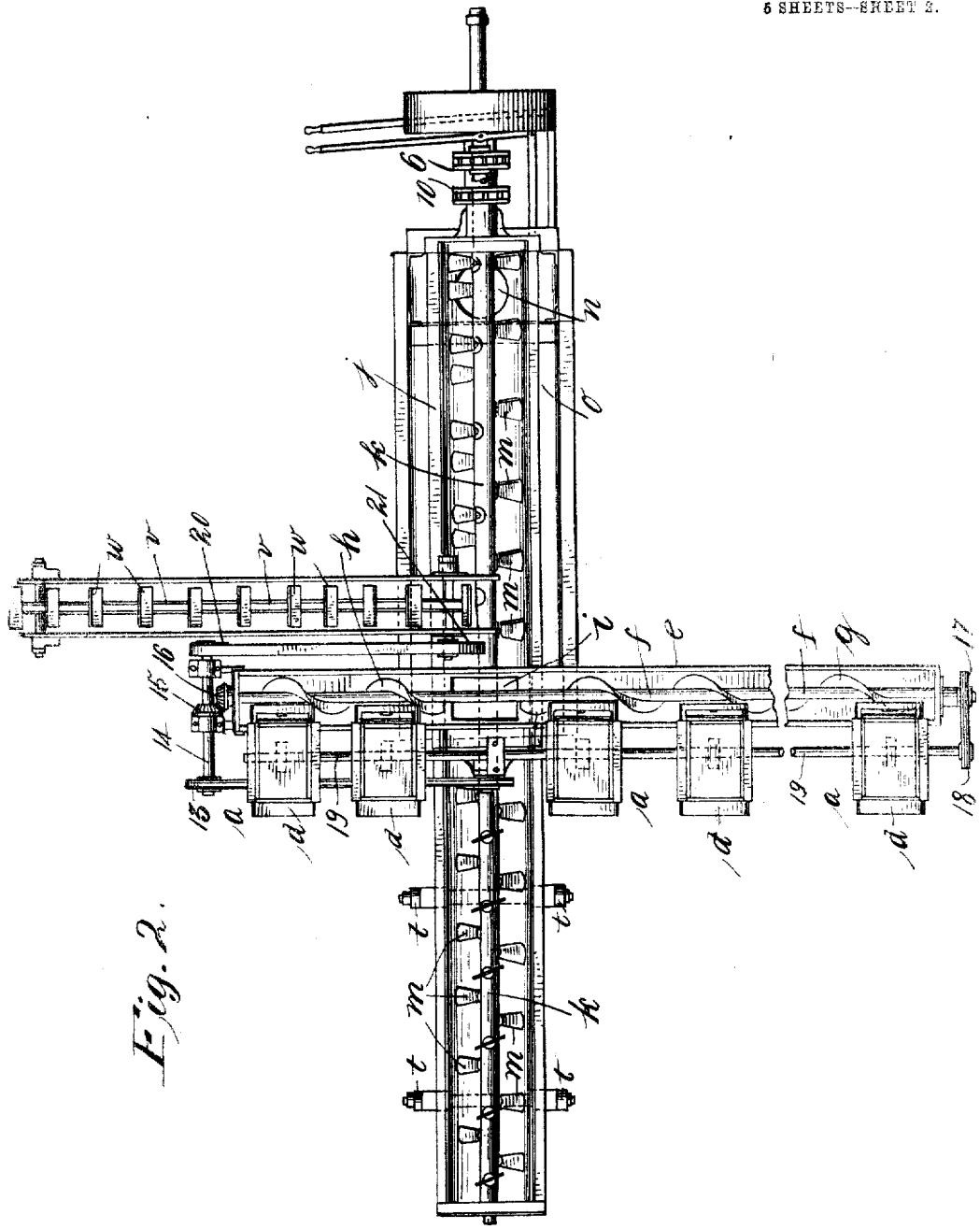

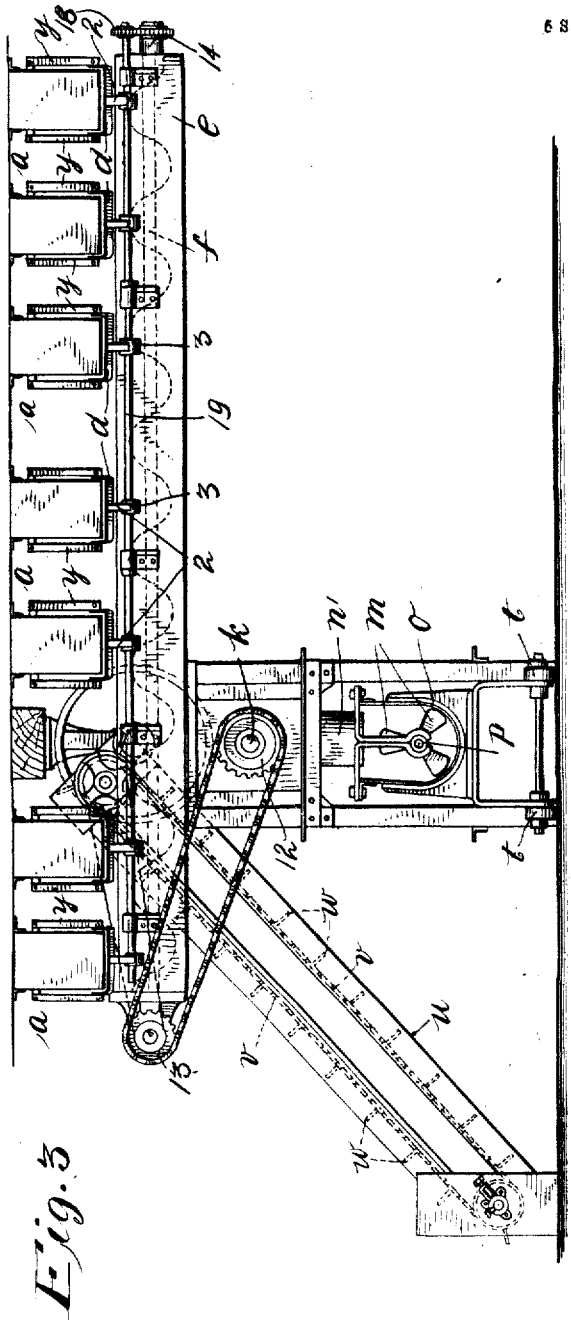

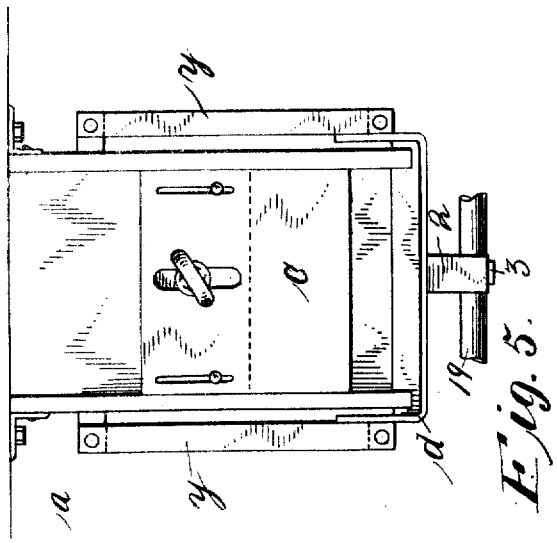
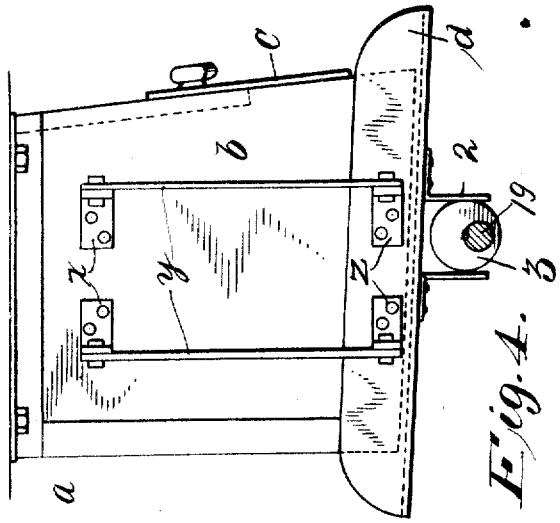

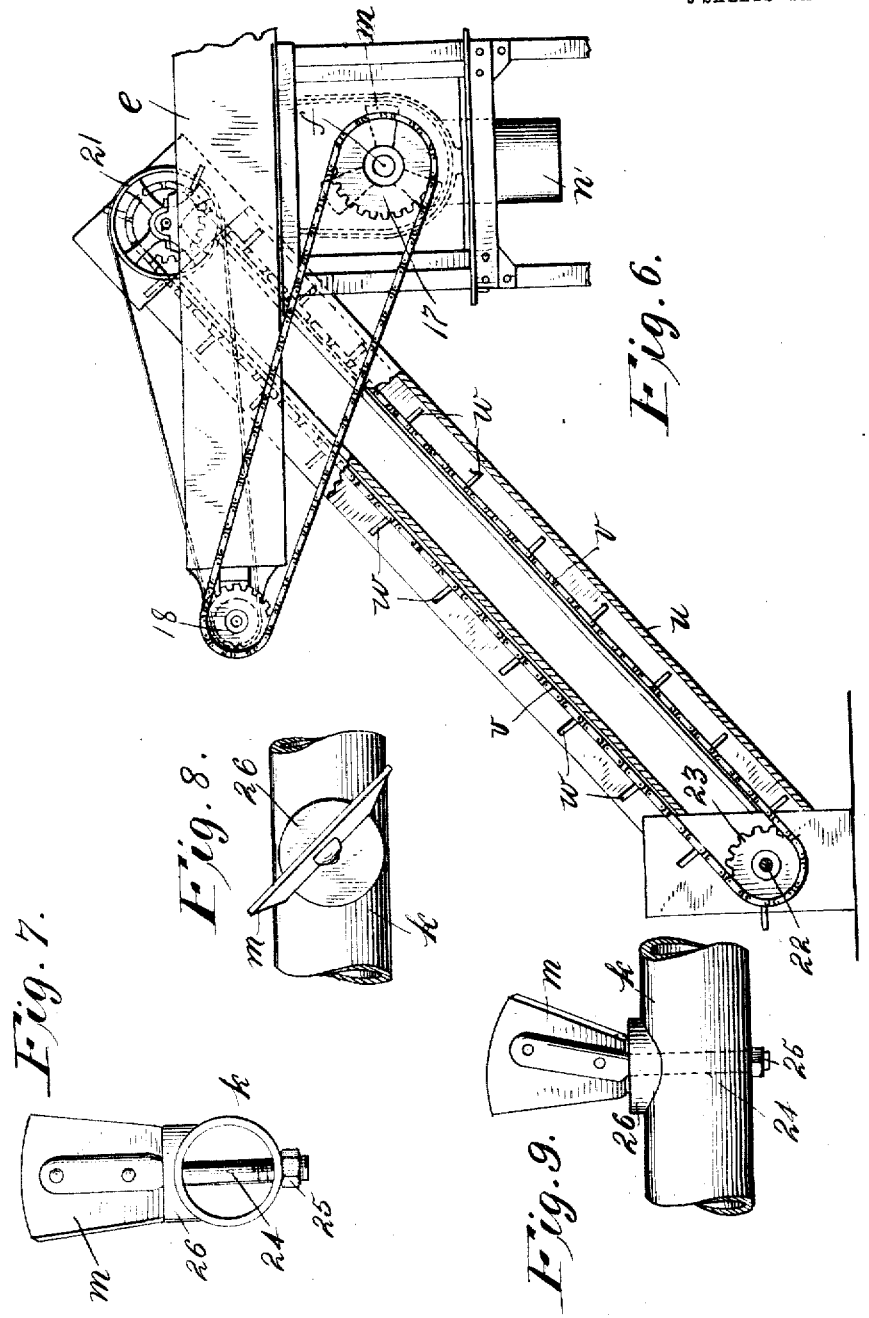

PATRICK McEVOY, OF OIL CITY, PENNSYLVANIA.

FEED-MIXER.

No. 902,992.

Specification of Letters Patent.

Patented Nov. 3, 1908.

Application filed September 16, 1907. Serial No. 393,057.

*To all whom it may concern:*

Be it known that I, PATRICK McEVOY, a citizen of the United States, residing at Oil City, in the county of Venango and State of Pennsylvania, have invented certain new and useful Improvements in Feed-Mixers, of which the following is a specification, reference being had to the accompanying drawings.
My invention relates to improvements in mixers of feed for poultry, live stock and the like; and an object of my invention is to provide a mixer of this class which will prove simple in construction, comparatively cheap in manufacture, efficient in use and which will mix the feed thoroughly and uniformly in a minimum of time, whereby a great saving of labor and time results.

In the drawings illustrating the principle of my invention and the best mode now known to me of applying that principle, Figure 1 is a front elevation; Fig. 2 a plan and Fig. 3 an end elevation of my new feed mixer, Fig. 3 being a view looking in the direction of the arrow in Fig. 1; Fig. 4 is a side elevation and Fig. 5 a front elevation of my new grain-feed-box; Fig. 6 is a detail showing the green-feed conveyer in elevation and Figs. 7, 8 and 9 are details illustrating the mixing-and-feeding blade and its mounting.

The ingredients to be mixed are held in a dry state in the feed-boxes $a$ the box or casing $b$ of which is bolted or otherwise fastened to the ceiling of the shed in which the mixer is installed; but these boxes may be otherwise suitably supported as desired. Each box $b$ is provided with a slidable door $c$ and with a movable bottom $d$. These feed-boxes overhang a conveyer-box $e$ in which is mounted a shaft $f$ which carries two helical blades $g$, $h$. Each blade is continuous throughout its length, and one blade is a right-handed helix while the other is a left-handed helix. These blades constitute helical conveyers which force the dry feed towards the opening $i$ in the bottom of the conveyer-box $e$. The latter is mounted above the dry-feed trough $j$ and the opening $i$ is directly over one end of the trough $j$. Thus, the material brought to the opening $i$ by the conveyer-blade $g$ falls through the opening together with the material forced thereto by the conveyer-blade $h$; and the mixing of feed in the trough $j$ is continuous through the whole length of the trough $j$. Extending through the latter is a rotary shaft $k$ upon which are mounted a series of mixing blades $m$, illustrated in detail in Figs. 7, 8 and 9. These blades are so placed and so inclined upon the shaft that their upper corners lie in the line of a helix or continuous screw.

As the shaft $k$ revolves, the blades $m$ beat up and thoroughly mix the dry feed and at the same time carry it towards the right hand end of the trough as viewed in Figs. 1 and 2. Further, the green-feed is caught between the edges of the blades and the sides of the trough, the blades being adjusted so that they co-act with the sides of the trough to cut the green-feed or grass into small bits. The movement of the material from end to end of the trough is slow, so that abundant opportunity is given for cutting the green-feed and thoroughly mixing the ingredients. At this end the bottom of the dry feed trough $j$ is formed with an opening $n$ which is fitted with a funnel pipe $n'$ which leads from the dry feed trough $j$ to the wet-feed trough $o$ and through which the dry feed falls into the wet-feed trough $o$. Through the latter extends a shaft $p$ upon which are mounted blades $m$ so inclined as to drive the feed from right to left, as viewed in Figs. 1 and 2. In this trough $o$ the feed is wetted with liquid which flows into the trough through the pipe $q$. Fitted to the discharge end of the wet-feed trough $o$ is an extension-trough $r$ connected therewith by a strap-joint $s$ and mounted upon rollers $t$. The extension trough $r$ may be readily disconnected from the wet-feed trough $o$ and readily removed when desired. In the summer this extension trough $r$ may be placed upon a platform outside of the shed; while in the winter it may be removed to allow the doors of the shed to be closed. Of course, the conveyer mounted in the extension trough $r$ is removed with the trough to permit this result to be accomplished.

In order to mix green feed, such as grass, with the meal and other ingredients, an inclined chute $u$ leads from near the floor to the dry-feed trough $j$; and in this chute $u$ is mounted an endless conveyer $v$ provided with transverse slats or carriers $w$. The grass or green feed is carried by the conveyer $v$ to the trough $j$ and is cut and mixed therein by means of the blades $m$.

Much difficulty has heretofore been experienced in obtaining a uniform mechanical feed of milled grain, such as meal, flour and bran. The feed-box designed by me for this purpose is shown in Figs. 4 and 5, in which the bottom $d$ is mounted free to swing back and forth beneath the box or casing $b$. The latter is provided on each side with brackets $x$ to which are secured one end of a pair of leaf springs $y$, the other end of which are secured to hangers $z$ fastened on each side of the bottom $d$. From the lower face of the latter projects ears 2 between which rotates a cam 3. The latter shifts the bottom $d$ back and forth, the bottom swinging on the yielding leaf-springs $y$. As is clearly indicated in Fig. 4 the bottom $d$ is slightly inclined to the horizontal. The amount of meal fed by the feeder $a$ may be varied by adjusting the position of the door $c$. The bottom $d$ feeds only during its movement towards the door $c$; and this arrangement of parts and the inclination of the bottom permits an accurate control to be exercised over the amount fed.

The troughs are suitably supported by the supporting framework 4. The feed-mixing mechanisms are driven from a shaft 5 upon which is mounted fast a sprocket 6 chain-connected with the sprocket 7 loose upon the shaft $p$. Keyed upon the latter is a clutch-collar 8 adapted to engage with the hub of the loose sprocket-wheel 7. Fast upon the shaft $p$ is a sprocket-wheel 9 chain-connected with the loose sprocket-wheel 10 mounted upon the shaft $k$, keyed upon which is the clutch-collar 11 adapted to engage the hub of the loose sprocket-wheel 10. When the clutch-collar 11 is free from the hub of the latter, the wet feed in the lowermost trough $o$ may be mixed without driving the other feeding and mixing mechanisms, as will now appear. Upon the other end of the shaft $k$ is mounted fast a sprocket-wheel 12 chain-connected with the sprocket-wheel 13, fast upon one end of a shaft 14 which carries a bevel-gear 15, which meshes with a bevel-gear 16 fast upon one end of the conveyer-shaft $f$. The other end of the latter carries a sprocket-wheel 17 chain-connected with the sprocket-wheel 18 mounted fast upon one end of the cam-shaft 19, which carries the cams 3 (Fig. 4). The shaft 14 carries a pulley 20 belt-connected with a pulley 21 which drives the shaft 22 upon which is mounted the sprocket 23. The latter drives the green-feed conveyer $v$. That portion of the shafts $k$ and $p$ upon which are mounted the blades $m$ is preferably hollow and through it extends the shank or stem 24 one end of which is threaded to receive the securing nut 25 and to the other end of which is riveted or otherwise suitably fastened the blades $m$. The latter rest upon washers 26, the lower face of which is suitably shaped to conform to the curvature of the hollow portion of the shafts $k$, $p$. By loosening the nut 25 the inclination of the blade $n$ may be adjusted.

I claim:

1. In a feed mixer, the combination of an endless conveyer for the green-feed; a trough into which said conveyer discharges the green-feed; and means mounted in said trough and coöperating therewith for simultaneously cutting the green-feed and mixing it with the other ingredients and then carrying the mixed mass lengthwise of said trough.

2. In a feed-mixer, the combination of a feed-box; a conveyer-box into which said feed-box discharges; a conveyer mounted in said conveyer-box; a slatted conveyer for the green-feed; a trough into which said green-feed conveyer and conveyer-box discharge; and means coöperating with said trough for cutting the green-feed and mixing the same with the other ingredients and then conveying the material.

3. In a feed mixer, the combination of a trough; an extension trough detachably connected therewith and mounted on rollers; and a mixing and conveying device mounted in said extension trough and removable therewith.

4. In a feed-mixer, the combination of a trough; an endless conveyer provided with slats for carrying the green-feed; devices mounted in said trough and coöperating therewith for chopping the green-feed and mixing the latter with the other ingredients; and means connecting said devices and green-feed conveyer, whereby the same are simultaneously operated.

5. In a feed mixer of the class described, the combination of a feed-box; a conveyer-box into which said feed-box discharges; a conveyer mounted in said conveyer-box; a trough into which said conveyer-box discharges; an endless conveyer having slats for carrying the green feed to said trough; mixing devices mounted in said trough; and actuating mechanism connecting said devices, conveyers and feed-boxes, whereby the same are operated simultaneously.

6. In a feed mixer, the combination of a feed-box having a movable bottom which lies in close proximity to the walls of said feed-box and is inclined to the horizontal; and means for moving said bottom to feed the material towards the lower edge of said bottom.

7. In a feed mixer, the combination of a feed-box having a movable bottom which lies in close proximity to the walls of said feed-box and is inclined to the horizontal, said feed-box being provided with a door free to be adjusted to and from said bottom; and means for moving said bottom to feed the material towards the lower edge of said bottom.

8. In a feed mixer, the combination of a box having a movable bottom; yielding devices by which said bottom is suspended; and cam-actuated means for moving said bottom to feed the material.

9. In a feed mixer, the combination of a trough; a shaft rotatably mounted therein; and blades mounted on said shaft free to be adjusted thereon, to bring said blades into cutting relation with the walls of said trough and the upper corners of said blades lying in a continuous helix; said blades being separate from each other.

10. In a feed mixer, the combination of a trough; a shaft rotatably mounted therein; blades mounted on said shaft; and a washer interposed between each of said blades and said shaft, said washer having its lower face formed to fit the curvature of said shaft; said blades co-acting with the walls of said trough to chop the green-feed.

11. In a feed-mixer, the combination with a conveyer-box having an opening intermediate its ends, of a series of feed-boxes some of which are arranged on one side of said opening and the others of which are arranged on the opposite side of said opening; a shaft mounted in said conveyer-box; and conveyers mounted on said shaft for moving the material from both said ends in opposite directions towards said opening.

12. In a feed mixer, the combination of a conveyer for the green feed; a trough into which said conveyer discharges; means for feeding the dry feed into said trough; means mounted in said trough and coöperating therewith for cutting said green feed and mixing it with the dry feed and a common mechanism for driving said means and conveyer.

13. A feed mixer consisting of a series of feed-boxes; a conveyer-box which is formed with an opening and into which said feed-boxes discharge, some of said feed-boxes being located on one side of said opening and the remainder of said feed-boxes being located on the opposite side of said opening; conveyer-devices which force the material from opposite ends of said conveyer-box to said opening; and a mixing trough into which said conveyer-box discharges through said opening.

14. A feed mixer consisting of a series of feed-boxes; a conveyer-box which is formed with an opening and into which said feed-boxes discharge, some of said feed-boxes being located on one side of said opening and the remainder of said feed-boxes being located on the opposite side of said opening; helical conveyer-blades which are mounted in said conveyer-box on opposite sides of said opening and which force the material from opposite ends of said conveyer-box to said opening; and a mixing trough into which said conveyer-box discharges through said opening.

15. A feed mixer consisting of a pair of mixing troughs arranged one above the other, the upper trough discharging into the lower trough; mixing devices mounted in each of said troughs; a driving shaft; means operatively connecting the latter with the mixing devices in the lower trough; and mechanism for connecting and disconnecting at will the mixing devices in the lower trough with and from the mixing devices in the upper trough, whereby the material may be mixed in the lower trough independently of the operation of the mixing devices in the upper trough.

In witness whereof I have hereunto set my hand in the presence of the two undersigned witnesses at said Oil City this 9th day of September, 1907.

PATRICK McEVOY.

Witnesses:
JNO. H. NILSSON,
LESTER J. BAGNALL.